United States Patent [19]

Sternfeld et al.

[11] 4,377,067
[45] Mar. 22, 1983

[54] STEAM GENERATOR

[75] Inventors: Hans J. Sternfeld, Friedrichsruhe; Josef Reinkenhof, Heilbronn; Heinrich Lambrecht, Neuenstadt, all of Fed. Rep. of Germany

[73] Assignee: Deutsche Forschungs- und Versuchsanstalt fur Luft- und Raumfahrt, Bonn, Fed. Rep. of Germany

[21] Appl. No.: 209,687

[22] Filed: Nov. 24, 1980

[51] Int. Cl.³ .............................................. F02C 7/00
[52] U.S. Cl. .................................. 60/39.55; 431/190
[58] Field of Search ............... 60/39.05, 39.53, 39.54, 60/39.55, 39.58, 39.59; 431/4, 190, 210, 211, 212

[56] References Cited

U.S. PATENT DOCUMENTS

| 822,491 | 6/1906 | Tonkin | 60/39.55 |
| 2,510,572 | 6/1950 | Goddard | 60/39.55 |
| 2,847,825 | 8/1958 | Spears | 60/39.55 |
| 3,101,592 | 8/1963 | Robertson et al. | 60/39.05 |

Primary Examiner—Louis J. Casaregola
Attorney, Agent, or Firm—Laubscher, Philpitt & Laubscher

[57] ABSTRACT

An injection head introduces $H_2$ and $O_2$ into one end of an elongate combustion chamber. At the same time, water is injected into the chamber through peripheral ducts to form a water curtain, or through inlets in the injection head, or through apertures facing away from the injection head in water-cooled tubing extending in a plane perpendicular to the chamber axis.

7 Claims, 10 Drawing Figures

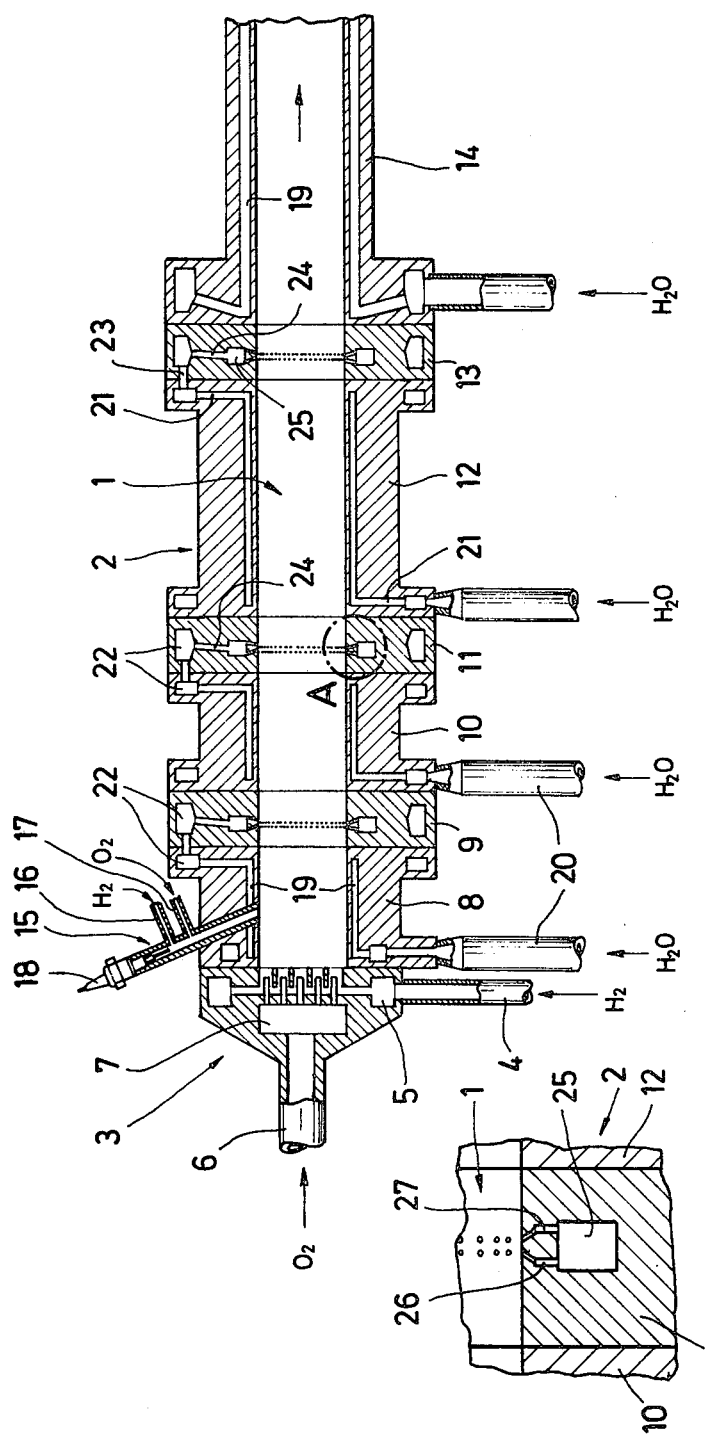

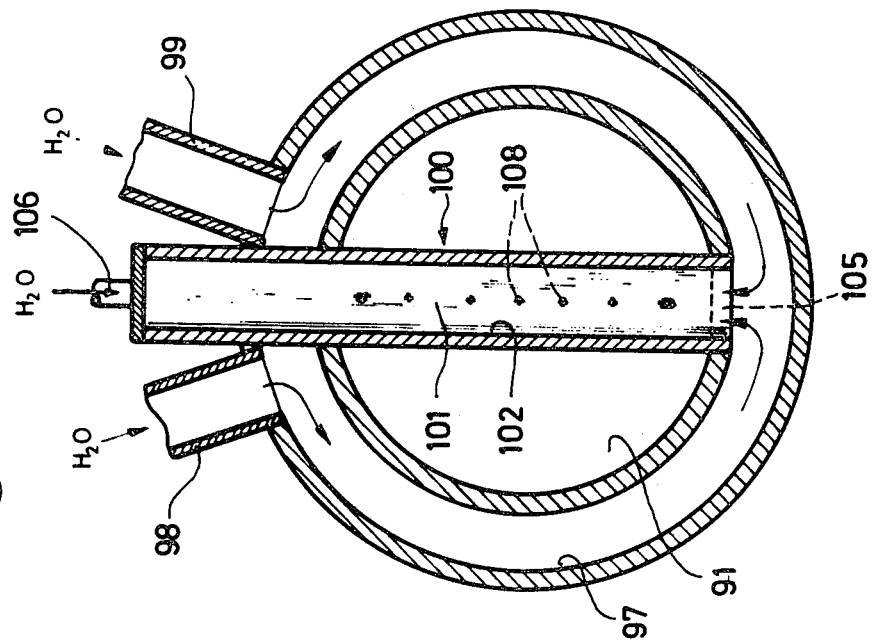
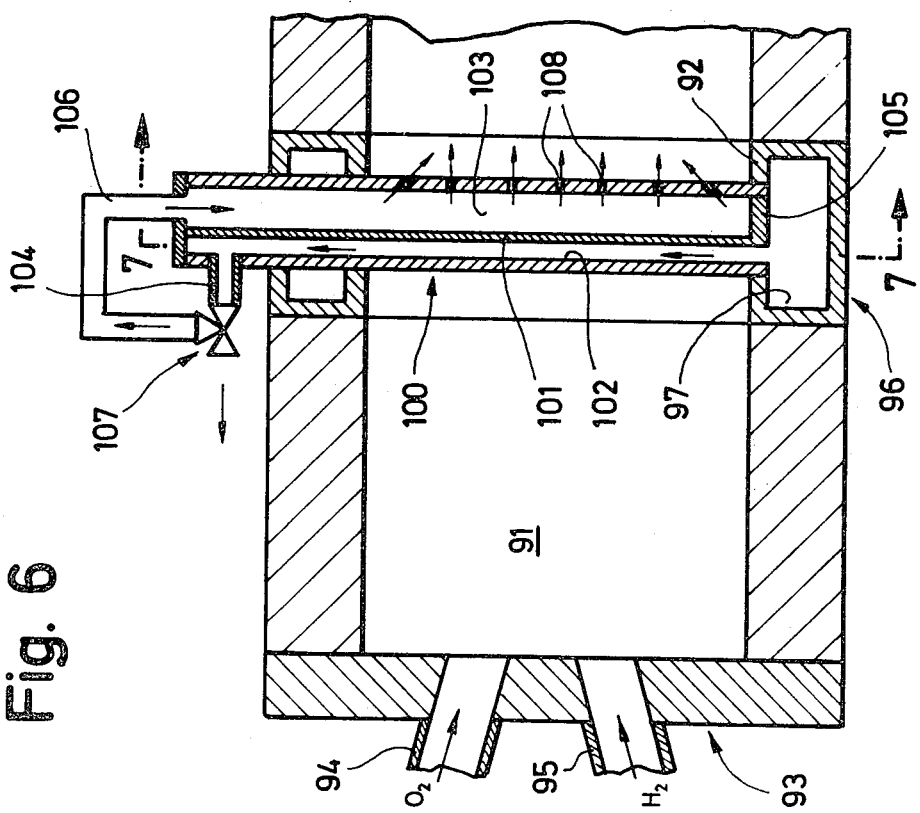

STEAM GENERATOR

The invention relates to a steam generator in which gaseous hydrogen and gaseous oxygen can be introduced by means of an injection head into a combustion chamber and can be burnt therein, the generator having inlet aperture for the injection of liquid (referred to below simply as water) into the combustion chamber.

BACKGROUND OF THE INVENTION

A steam generator is described in German Pat. specification No. 1 301 821 in which fuels which cannot usually be completely condensed are burnt in a combustion chamber and the combustion gases flow through the combustion chamber to an outlet. Water is injected into the combustion gases through apertures which are disposed alongside the flow path in the side wall of the combustion chamber at the location of a duct constriction and such water evaporates owing to the elevated temperature of the combustion gases. The superheated steam generated by means of this device is used particularly for the operation of ejectors in order to operate altitude simulation systems.

Such a rocket propulsion drive combustion chamber would also be suitable for generating steam which can be used for driving a turbine. In this context, it is essential for the gas generated by the combustion chamber to be completely condensable, i.e. no combustion gas residue must remain. This requirement can be satisfied with particular advantage if hydrogen and oxygen are used as combustion gases in a stoichiometric ratio since water is produced by complete combustion. The addition of water to the hot combustion gases also reduces the temperature of the combustion gases, thus achieving a temperature of the order of 900° C., which is acceptable for the operation of turbines.

The efficiency of such combustion chambers is naturally particularly high when the most uniform possible contact between the injected water and the hot combustion gases is achieved, because the evaporation rate will then be an optimum. What is desired is a steam generator which permits particularly advantageous utilisation of the thermal energy which is stored in the hot combustion gases.

SUMMARY OF THE INVENTION

In accordance with the invention the apertures for injecting water into the combustion chamber are arranged so that water can be injected into the combustion gas stream over the entire cross-section of the combustion chamber.

One preferred embodiment of the invention provides that inlet ducts for water are disposed in two inlet planes, positioned perpendicularly with respect to the gas flow direction, and are situated at a distance from each other in the gas flow direction in a wall which surrounds the combustion chamber, and said ducts are oriented so that the jets which emerge from two ducts disposed in different inlet planes, strike each other along a rebound plane which is disposed between the two inlet planes, so that a water curtain extending substantially perpendicularly with respect to the gas flow direction is produced by the totality of water jets which impinge upon each other.

A water curtain of this kind can advantageously enter into the flowing gases over the entire cross-section of the combustion chamber.

In this context it is advantageous if the distance between adjacent inlet planes is short in relation to the length of the combustion chamber.

Advantageously, a plurality of pairs of inlet planes is provided along the combustion chamber. The distance between different inlet plane pairs can increase with the distance from the injection head.

Another preferred embodiment provides that inlets for water are disposed in the injection head in addition to inlet ports for hydrogen and oxygen. In this embodiment it is therefore possible for water to be injected from an end face injection plate of the injection head into the combustion chamber over the entire cross-section thereof so that the liquid water is mixed particularly advantageously with the combustion gases. To this end, it is advantageous if the water inlets are distributed substantially over the entire cross-sectional area of the combustion chamber.

Another preferred embodiment of the invention provides that, in a plane which extends perpendicularly with respect to the longitudinal axis of the combustion chamber, there is provided at least one tube, the interior of which is divided by means of a bulkhead into a first compartment nearer to the injection head and into a second compartment which is distal from the injection head, the first compartment is provided with a cooling water supply and cooling water discharge means so that cooling water can be conducted therethrough, and the second compartment is provided with a water supply and with apertures, situated on the side which is distal from the injection head, so that water can be injected through this compartment into the combustion chamber.

This construction also permits water to be introduced into the combustion gases over the entire diameter of the combustion chamber, more particularly if high pressures prevail in the combustion chamber. The tubing extending into the combustion chamber is adequately cooled because cooling water is conducted on the side nearer to the injection head.

The tubing may consist of a single tube. It is advantageous if the second compartment communicates via a closable duct with the cooling water discharge means of the first compartment. The water, used for cooling the tubing and therefore preheated, can thus be used as injection water.

In a further development, it is possible to arrange for several tubes to be combined into a tube system, while leaving space to allow the passage of combustion gases between the individual tubes. For example, the tube system can comprise two intersecting tubes or three tubes which converge in the combustion chamber middle and are offset with respect to each other by 120°. It is also possible for the tube system to comprise a plurality of parallel tubes intersecting with a plurality of tubes extending perpendicularly thereto.

It is advantageous in all embodiments if the injection head comprises an injection plate which consists of sintered metal and is permeable to gaseous hydrogen and through which oxygen injection ducts (and, where appropriate, water injection ducts) extend; preferably the injection plate closes a cavity which is situated in the body of the injection head, extends to the combustion chamber, and communicates with a hydrogen duct. This permits introduction of the hydrogen into the combustion chamber in very uniform distribution over the combustion chamber cross-section and advantageous mixing of the combustion gases is obtained thereby. The gas cushion in front of the injection plate also provides thermal insulation, i.e. the injection plate is shielded from the hot combustion gases.

BRIEF DESCRIPTION OF THE DRAWINGS

Preferred embodiments of the invention are described below with reference to the accompanying drawings, in which:

FIG. 1 is a diagrammatic longitudinal sectional view of a steam generator;

FIG. 2 is an enlarged part view of the region designated A in FIG. 1;

FIG. 6 is a diagrammatic sectional view of another embodiment of a steam generator, with a water injection tube which extends across the combustion chamber.

FIG. 7 is a section along the line 7—7 of FIG. 6;

DESCRIPTION OF PREFERRED EMBODIMENTS

Figure 3:
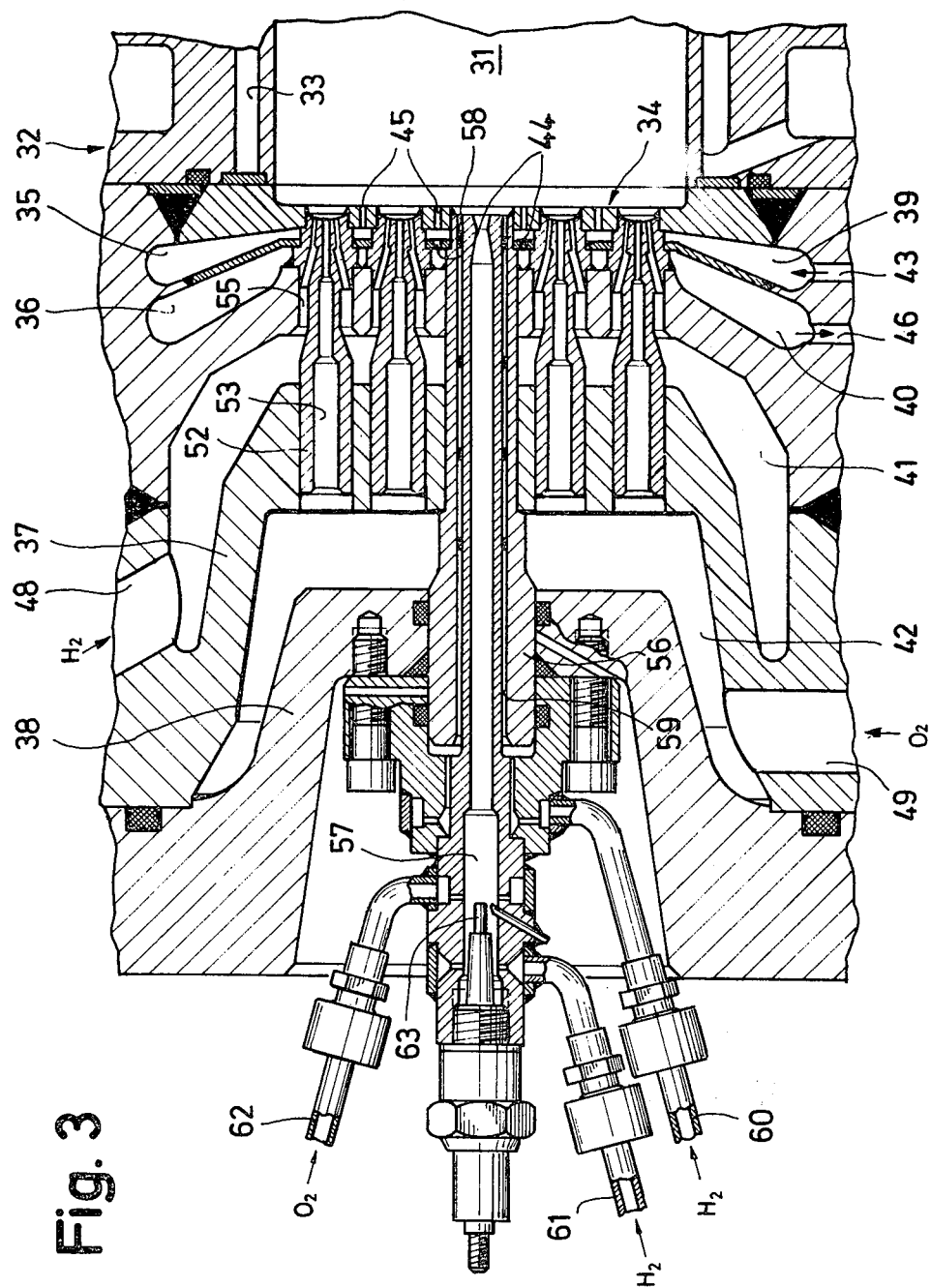
FIG. 3 is an enlarged partial sectional view of an embodiment of an injection head for a steam generator.

FIG. 1 shows a steam generator which comprises a combustion chamber 1 surrounded by a shell or housing 2. Advantageously, the cross-section of the combustion chamber 1 is circular. At one end the combustion chamber is closed by an injection head 3 which contains a distributor chamber 5 for hydrogen, communicating with a duct 4, and a distributor chamber 7 for oxygen, communicating with a duct 6. Both distributor chambers 5 and 7 communicate with corresponding inlet ports in the injection head 3, so that hydrogen and oxygen can pass from the distributor chambers into the combustion chamber.

The shell 2 in the illustrated embodiment is of segmental construction, i.e. segments 8,9,10,11,12,13,14 adjoin each other. This facilitates any change of the construction of the steam generator for experimental purposes but is not absolutely necessary for the operation of the combustion chamber, i.e. the shell can be constructed, for example, integrally. A pilot ignition chamber 15, communicating with the combustion chamber 1, is disposed in the segment 8 adjacent to the injection head 3. A hydrogen supply duct 16 and an oxygen supply duct 17 extend into the ignition chamber 15. An ignition electrode 18 extends into the ignition chamber 15.

The various segments 8, 10, 12, and 14 are provided with ducts 19 into which cooling water can be introduced via supply ducts 20, which cooling water is at least partially returned through cooling water discharge ducts to a cooling device in a manner not shown. The ducts 19 extend parallel with the longitudinal axis of the combustion chamber close to the circumferential surface defining the combustion chamber and each communicates by means of a radial portion 21 with annular chambers 22. Annular chambers 22 of adjacent segments 8 and 9, 10 and 11, or 12 and 13 communicate with each other by means of a connecting duct 23. A radial duct 24 extends from the outer annular chamber 22 in each of the segments, 9, 11, 13 to an inner annular chamber 25 which communicates along is circumference by means of a plurality of inlet ducts 26, 27 with the combustion chamber 1. The region of the annular chamber 25 and of the inlet ducts 26, 27 is shown in enlarged form in FIG. 2. It can be seen that a first group of inlet ducts extends into the combustion chamber along the periphery of a first plane perpendicular to the gas flow direction, while a second group of inlet ducts extends into the combustion chamber along the periphery of second plane parallel with the first plane but offset in the gas flow direction. The entry regions of the inlet ducts 26 of the first group and of the inlet ducts 27 of the second group are orientated towards each other, so that the water jets emerging therefrom meet in a plane between the exit planes of the inlet ducts 26, 27. The compact water jets are torn apart into small droplets in this impact plane and are diverted into a substantially radial direction. The inlet ducts, which are distributed along the circumference of the combustion chamber, therefore cause an inwardly oriented water curtain to be produced in the impact plane, by means of which curtain the hot combustion gases can be loaded with liquid water over the entire cross-section of the combustion chamber.

A water inlet element of this kind is provided in each segment 9, 11, 13. The distances between the inlet elements can increase along the combustion chamber axis, since the temperature of the combustion gases drop as a result of successive loading with liquid water and since accordingly the process of evaporation is slowed down from one to the next water inlet element.

In view shown in FIG. 1, the combustion chamber is shown broken off at its exit side. At that place, the combustion chamber can extend into a turbine casing.

In operation of the combustion chamber illustrated in FIG. 1 uniform loading of the combustion gases with water and therefore an optimum evaporation efficiency can be achieved by the water injection described above.

Furthermore, the pilot ignition chamber 15 permits gentle commencement of operation of the combustion chamber. The combustion process can be started in the ignition chamber 15 by means of the hydrogen and oxygen gases supplied thereto, while the supply of hydrogen and oxygen to the main combustion chamber 1 is restricted. The hot combustion gases passing from the ignition chamber 15 into the combustion chamber 1 ignite the gases therein, but this does not result in any sudden pressure rise which could damage the turbine or other equipment connected downstream. As soon as combustion commences in the combustion chamber 1, the gas supply therein can be increased to the normal rate, so that combustion takes place at the full extent.

The ignition chamber 15 of the exemplified embodiment shown in FIG. 1 is inclined in the flow direction, i.e. its longitudinal axis forms an acute angle with the flow direction.

FIG. 3 shows part of a modified embodiment of an injection head. A combustion chamber 31 is surrounded by a shell or housing 32 which contains cooling water ducts 33 as in the embodiment illustrated in FIG. 1. An injection plate 34 closes the end face of the combustion chamber 31. Inserts 35, 36, 37 and 38, of substantially cup-shaped configuration, adjoin the injection plate 34 and are placed concentrically one upon the other so as to be sealed against each other. A first cavity 39 is defined between the insert 35 and the injection plate 34, a second cavity 40 is defined between the insert 35 and the insert 36, a third cavity 41 is defined between the insert 36 and the insert 37, and a fourth cavity 42 is disposed between the insert 37 and the insert 38. The first cavity 39, adjacent to the combustion chamber, communicates with a supply duct 43 and delivery ports 44 so that cooling water can be conducted through the cavity 39. Ports 45 in the injection plate 34 extend from the cavity 39 into the combustion chamber 31. Cooling water which flows through the cavity 39 can thus pass at least partially through the ports 45 into the combustion chamber. Advantageously, the ports 45 are uniformly distributed over the surface area of the injection plate 34 so that uniform injection of water is made possible over the entire cross-section of the combustion chamber.

The second cavity 40, disposed next to the cavity 39, is provided to discharge the cooling water, which enters the cavity 40 through discharge ports 44 and emerges therefrom through a discharge duct 46.

The third cavity 41, communicates with a hydrogen supply duct 48 and the fourth cavity 42 communicates with an oxygen supply duct 49. A plurality of tube members 52 are provided to supply the fuels to the combustion chamber. The tube members are inserted through bores in the insert 37, through bores in the insert 36, through bores in the insert 35, and through bores in the injection plate 34, to extend into the combustion chamber 31 and are welded to the walls of the cavities. The cavities 39, 40, 41 and 42 remain separated from each other by means of the welding seams; the bores 53 of the tube members 52 connects the cavity 42 to the combustion chamber, ducts 55 around the tube members connect the cavity 41 to the combustion chamber, and the ports 45 connect the cavity 39 to the combustion chamber.

A bush 56 passes along the axis of symmetry of the arrangement through concentric bores in the inserts 35, 36, 37, and 38 and in the injection plate 34 in a sealing manner. A pilot ignition chamber 57 is inserted into the bush 56 and retained therein by means of spacer weld spots 58 so that an annular gap 59 is produced between the bush 56 and the wall of the ignition chamber 57. This annular gap 59 communicates with a hydrogen supply duct 60 through which hydrogen gas can be conducted for cooling purposes through the annular gap.

A hydrogen supply duct 61 and an oxygen supply duct 62 extend into the ignition chamber 57. An electric ignition electrode 63 is disposed at the end of these ducts, remote from the combustion chamber 31.

Apart from the means for supplying water through the injection plate as already described, the injection head illustrated in FIG. 3 differs from the injection head of FIG. 1 in particular by virtue of the ignition chamber being integrated with the injection head.

In principle, the method of operation is the same as described above.

This device ensures uniform and thorough mixing of the combustion gases with water and therefore ensures optimum evaporation performance, more particularly in the region of the injection head. The concentric supply of hydrogen and oxygen through the central bores 53 and through the ducts 55 ensures thorough mixing of the combustion gases and this in turn ensures complete combustion of the gases, as is essential for performing a circulating process.

Figure 4:
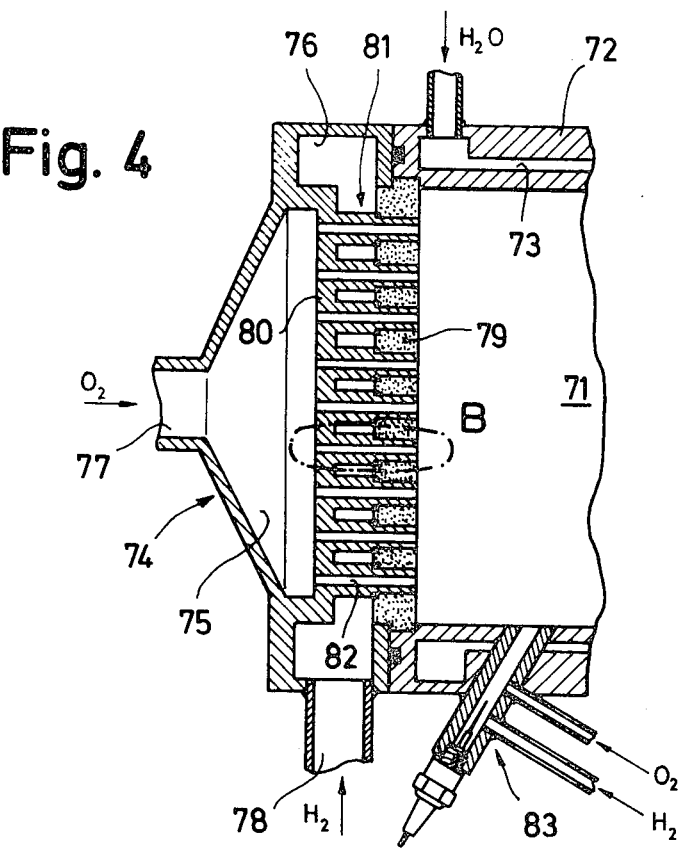
FIG. 4 is a partial sectional view of another embodiment of an injection head for a steam generator.
Figure 5:
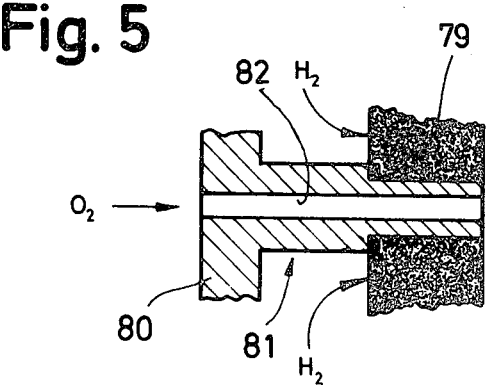
FIG. 5 is an enlarged view of the region designated B in FIG. 4.

FIG. 4 shows another exemplified embodiment of the injection head of the steam generator in diagrammatic form. In this embodiment, a combustion chamber 71 is surrounded by a jacket 72 in which cooling water ducts 73 are disposed. A pilot ignition chamber 83 is provided as described above with reference to the ignition chamber 15 in FIG. 1.

The injection head 74 has two cavities 75 and 76 which are connected to an oxygen duct 77 and a hydrogen duct 78 respectively. The cavity 76, closest to the combustion chamber 71, is separated from the combustion chamber by means of an injection plate 79 of sintered metal. This can be produced for example, by the application of heat and pressure to small alloy-steel balls, and is so porous that the gaseous hydrogen can enter the combustion chamber 71 from the cavity 76. A bulkhead 80, which separates the cavities 75 and 76 from each other, has extensions 81, each with a central bore 82, which reach through the cavity 76 and through the injection plate 79 into the combustion chamber 1. Oxygen can enter through these extensions or ducts 81 into the combustion chamber 71. It can be seen that the oxygen, conducted through the extensions 81 into the combustion chamber 71 can mix intimately in the entry region with the hydrogen which passes through the porous injection plate 79, so that a particularly homogeneous gas mixture is obtained in the combustion chamber.

A modified system for injecting water into the combustion gases is illustrated in FIGS. 6 and 7. FIG. 6 shows in diagrammatic form a combustion chamber 91 with a shell 92 and an injection head 93 which is supplied with the hydrogen and oxygen gases through ducts 94 and 95, respectively. One region 96 of the shell 92 serves as a cooling and water-injection element and accomodates an annular duct 97 into which cooling water can be introduced via ducts 98 and 99 (FIG. 7). The annular duct 97 communicates with a tube 100 which extends diametrically across the combustion chamber 91. The tube 100 is divided by a bulkhead or partition 101 into two compartments 102 and 103. The first compartment 102 (proximal to the injection head 93) communicates at one end with the annular duct 97 and is provided at the opposite end with an exit duct 104. The second compartment 103 (digital from the injection head 93) is closed at one end with respect to the annular duct 97 by means of an end plate 105 and at its opposite end it communicates with an inlet duct 106. The exit duct 104 is connected to the inlet duct 106 via a changeover valve 107 through which the exit duct 104 can be optionally connected to the inlet duct 106 or to a discharge duct (not shown). On the side which is distal from the injection head 93 the tube wall is provided with a plurality of apertures 108 through which the compartment 103 communicates with the combustion chamber 91.

In operation, the cooling water which enters through the ducts 98 and 99 into the annular duct 97 first serves to cool the combustion chamber shell 92 and, owing to the relatively small cross-section of the compartment 102, then flows at high velocity through the compartment 102. This ensures highly effective cooling of the tube 100 which is exposed to the hot combustion gases. All of the cooling water emerging from the exit duct 104 can be conducted to the discharge duct (not shown) but it is possible for part of such water to enter via the inlet duct 106 into the compartment 103 from where it is injected through apertures 108 into the combustion chamber 91 away from the injection head 93. Injection of wter is performed over the entire diameter of the combustion chamber, so that combustion gases close to the axis of the combustion chamber can also be laden with water.

Figure 8:
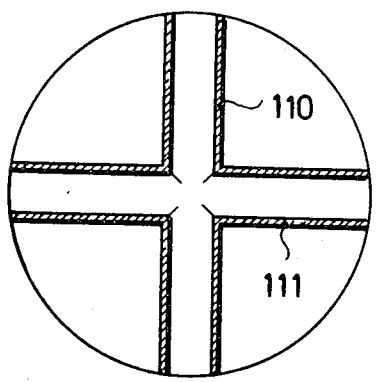
FIG. 8 is a section of an injection tube system in a preferred embodiment, the section being taken in the same plane as in FIG. 7.
Figure 9:
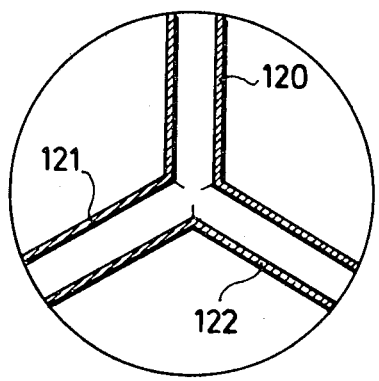
FIG. 9 is a view similar to FIG. 8 of another preferred embodiment of an injection tube system.
Figure 10:
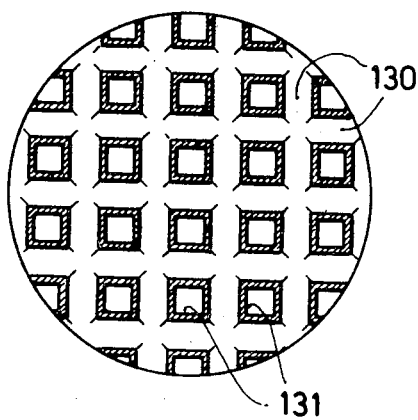
FIG. 10 is a view similar to FIG. 8 of another preferred embodiment of an injection tube system.

The injection system just described has a single tube 100 which extends diametrically across the combustion chamber. It is of course possible for a more complicated tube system to be employed instead of the single tube 100. Examples of modified tube systems are shown in diagrammatic form in FIGS. 8 to 10. In the example shown in FIG. 8, the tube system comprises two intersecting tubes 110 and 111 which extend diametrically across the combustion chamber at 90° to each other. In the example of FIG. 9 the tube system comprises three tubes 120, 121, 122 which join in the centre of the combustion chamber and are offset through 120° relative to each other. Finally, in the exemplified embodiment illustrated in FIG. 10, the tube system comprises a plurality of intersecting tubes 130 between which interstices 131 remain through which the combustion gases can flow. The important feature in all these systems is that cooling water flows at high velocity through the tube system side nearest to the injection head so that highly effective cooling is achieved. Injection of water is performed on the opposite side, i.e. on the downstream side.

We claim:
1. A steam generator, comprising
   (a) means defining a combustion chamber having a longitudinal axis;
   (b) an injection head for introducing gaseous hydrogen and gaseous oxygen into one end of said combustion chamber;
   (c) tubing means extending within said chamber in a plane substantially perpendicular to the longitudinal axis thereof;
   (d) means longitudinally partitioning said tubing means into a first compartment adjacent said injection head and a second compartment remote from said injection head;
   (e) means for supplying water to the first compartment, and means for discharging water from the first compartment so that water is conducted through the first compartment in order to cool the tubing; and
   (f) means for supplying water to the second compartment, said second compartment having a wall portion containing apertures for injecting water into the combustion chamber away from the injection head.

2. The steam generator of claim 1, in which the means for supplying water to the second compartment communicates with the means for discharging water from the first compartment.

3. The steam generator of claim 1, in which the means for supplying water to the first compartment comprises a cooling cavity in the combustion chamber wall, the cooling cavity communicating with the first compartment.

4. The steam generator of claim 1, in which the tubing comprises a plurality of tube means.

5. The steam generator of claim 4, in which the tubing means comprises two tubes which intersect.

6. The steam generator of claim 4, in which the tubing means comprises a pluraity of tubes which converge in the middle of the combustion chamber, the angle between adjacent tubes being the same.

7. The steam generator of claim 4, in which the tubing means comprises a plurality of parallel tubes which intersect with a plurality of tubes extending perpendicularly thereto.

* * * * *